Figure 12:
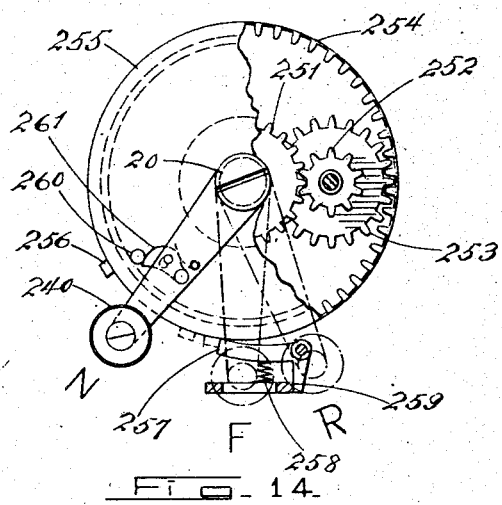

March 9, 1926.
J. T. HURLEY
1,575,835
MULTIPROCESS REGISTER
Filed Oct. 30, 1923 10 Sheets-Sheet 1
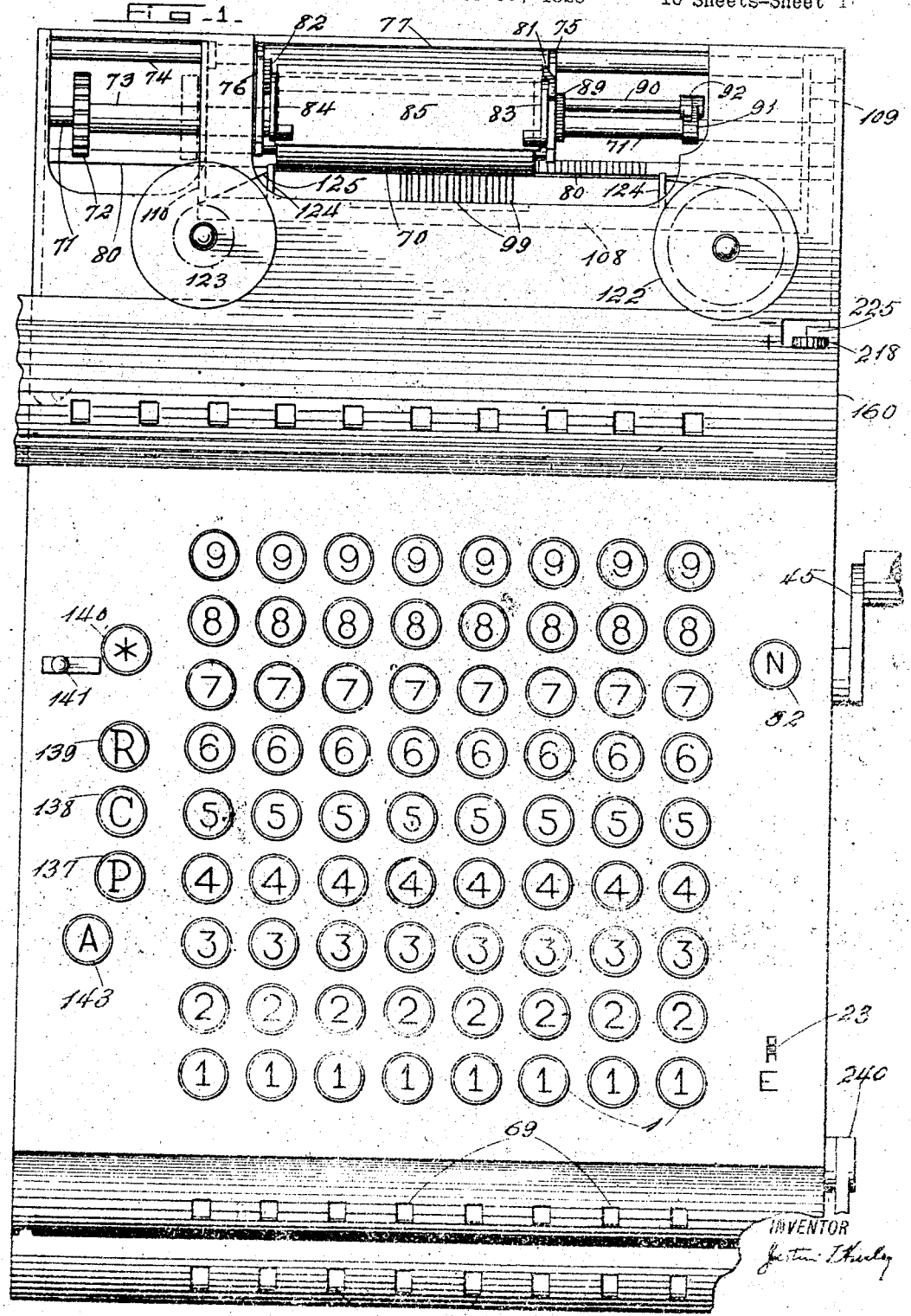
INVENTOR

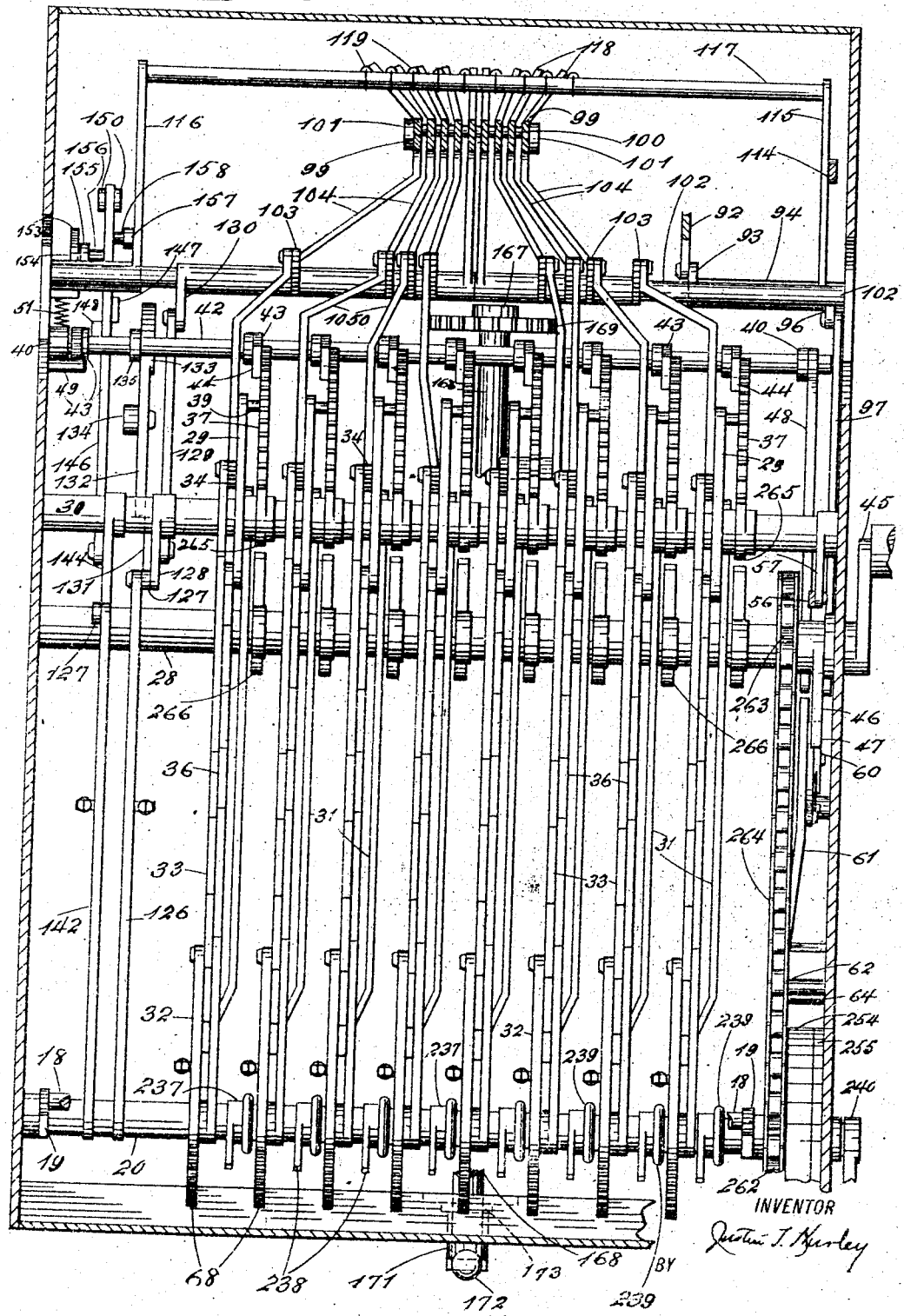

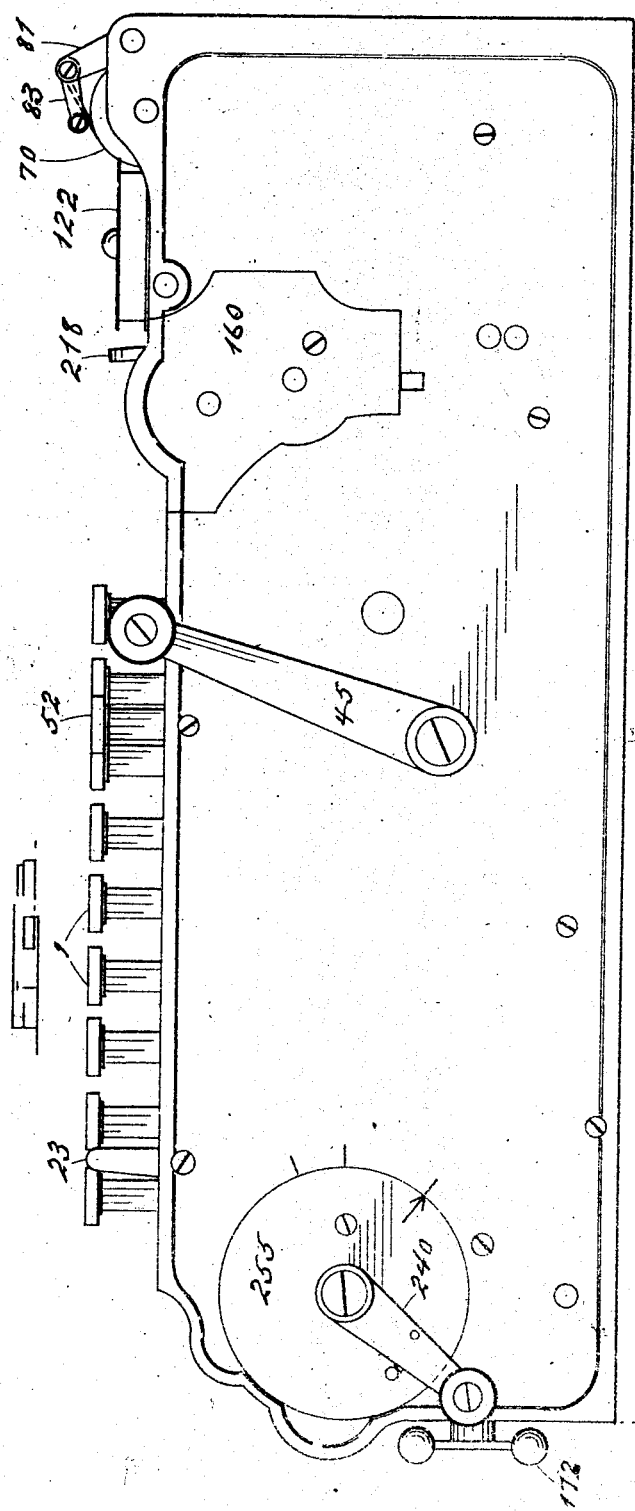

March 9, 1926.
J. T. HURLEY
1,575,835
MULTIPROCESS REGISTER
Filed Oct. 30, 1923
10 Sheets-Sheet 4
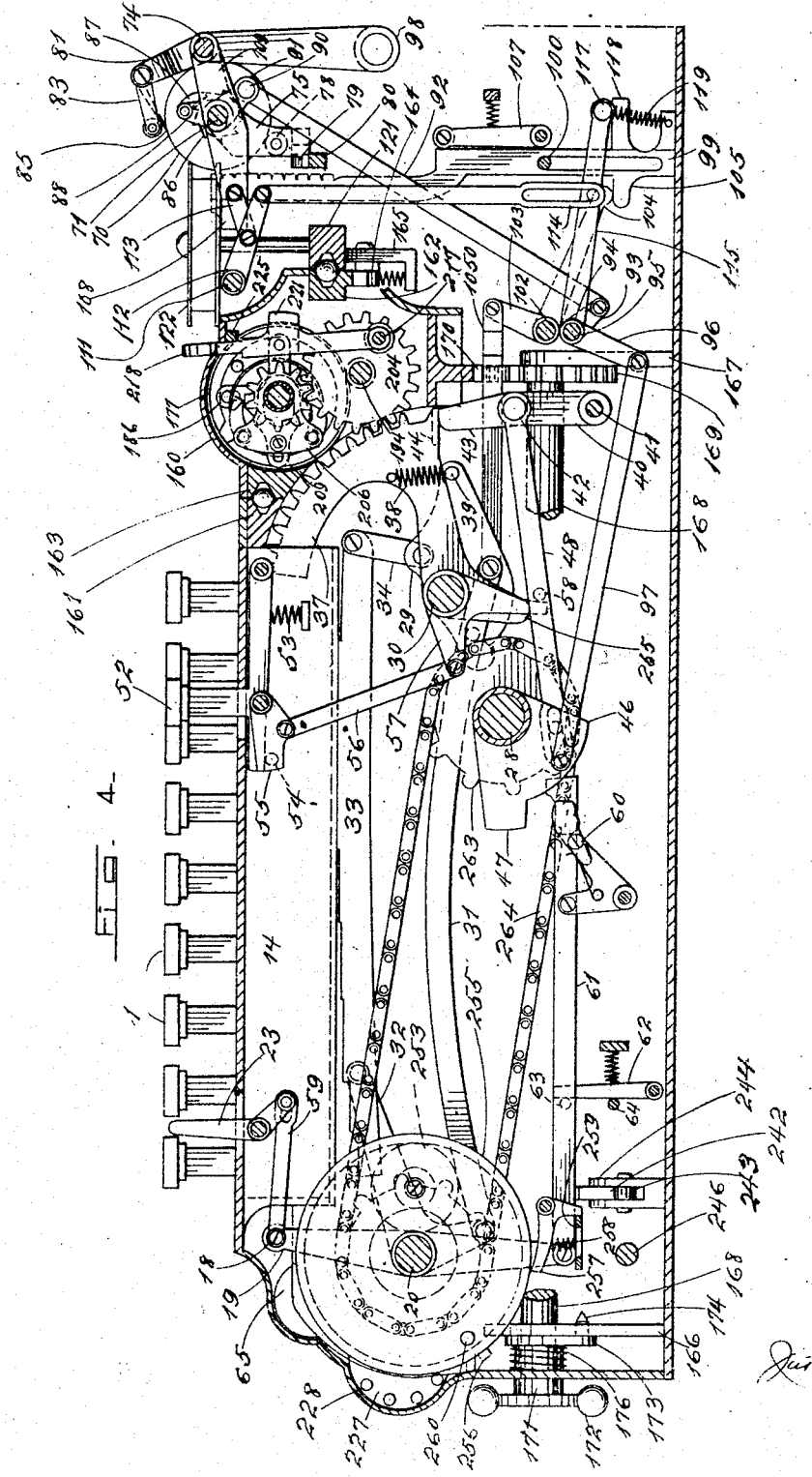
INVENTOR March 9, 1926.
J. T. HURLEY
1,575,835
MULTIPROCESS REGISTER
Filed Oct. 30, 1923
10 Sheets-Sheet 5
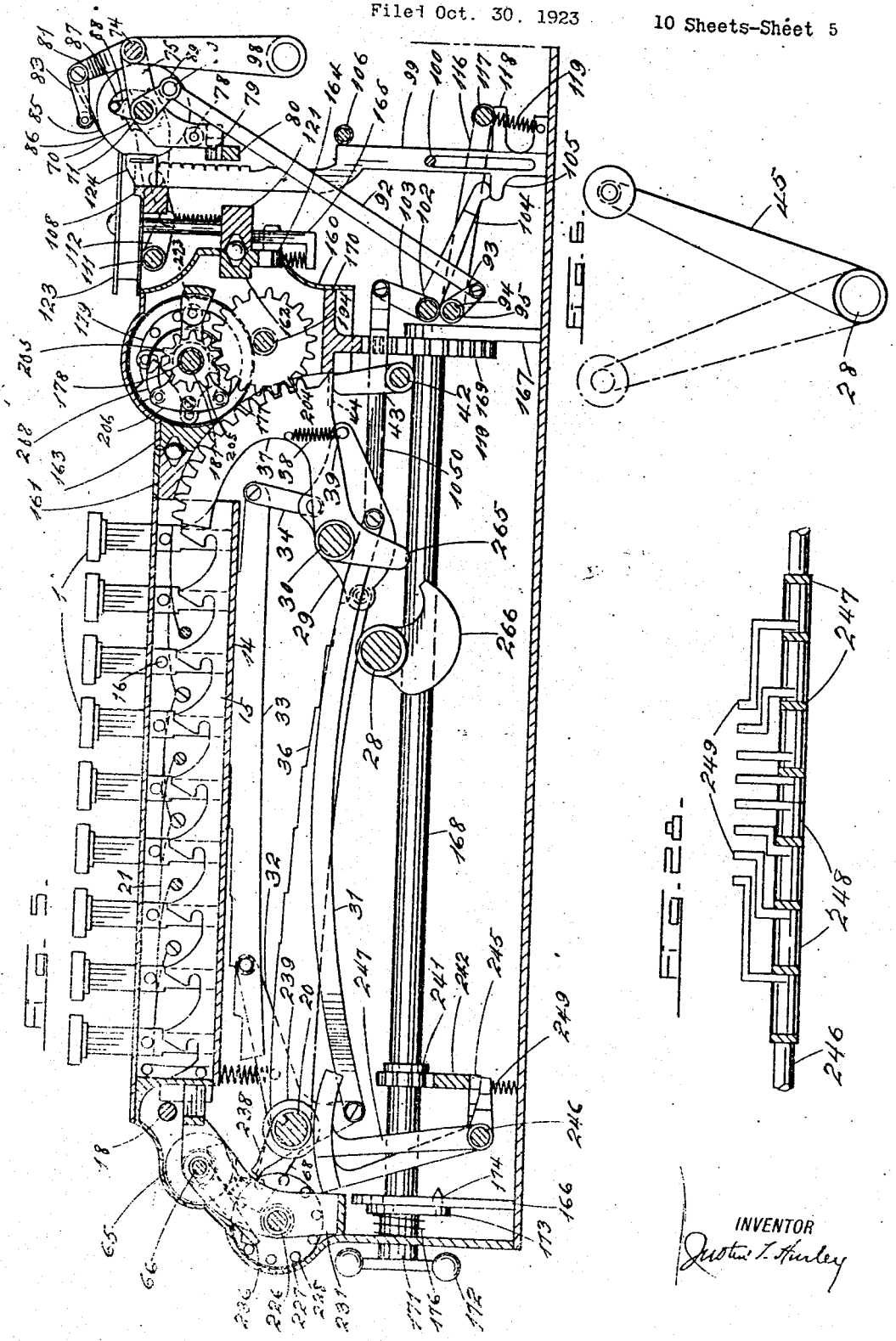
INVENTOR
Justin T. Hurley

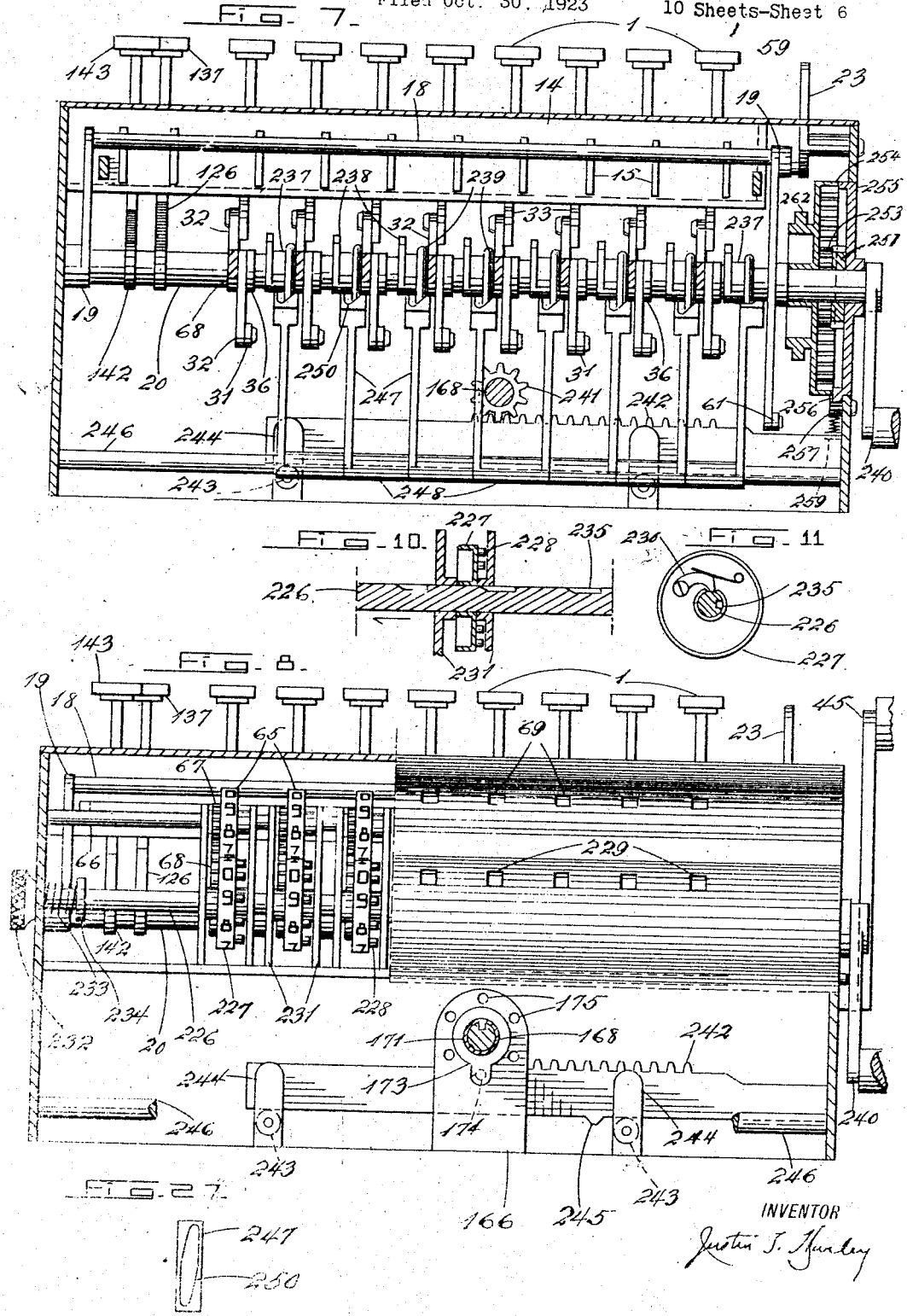

March 9, 1926.
J. T. HURLEY
MULTIPROCESS REGISTER
Filed Oct. 30, 1923
1,575,835
10 Sheets-Sheet 7
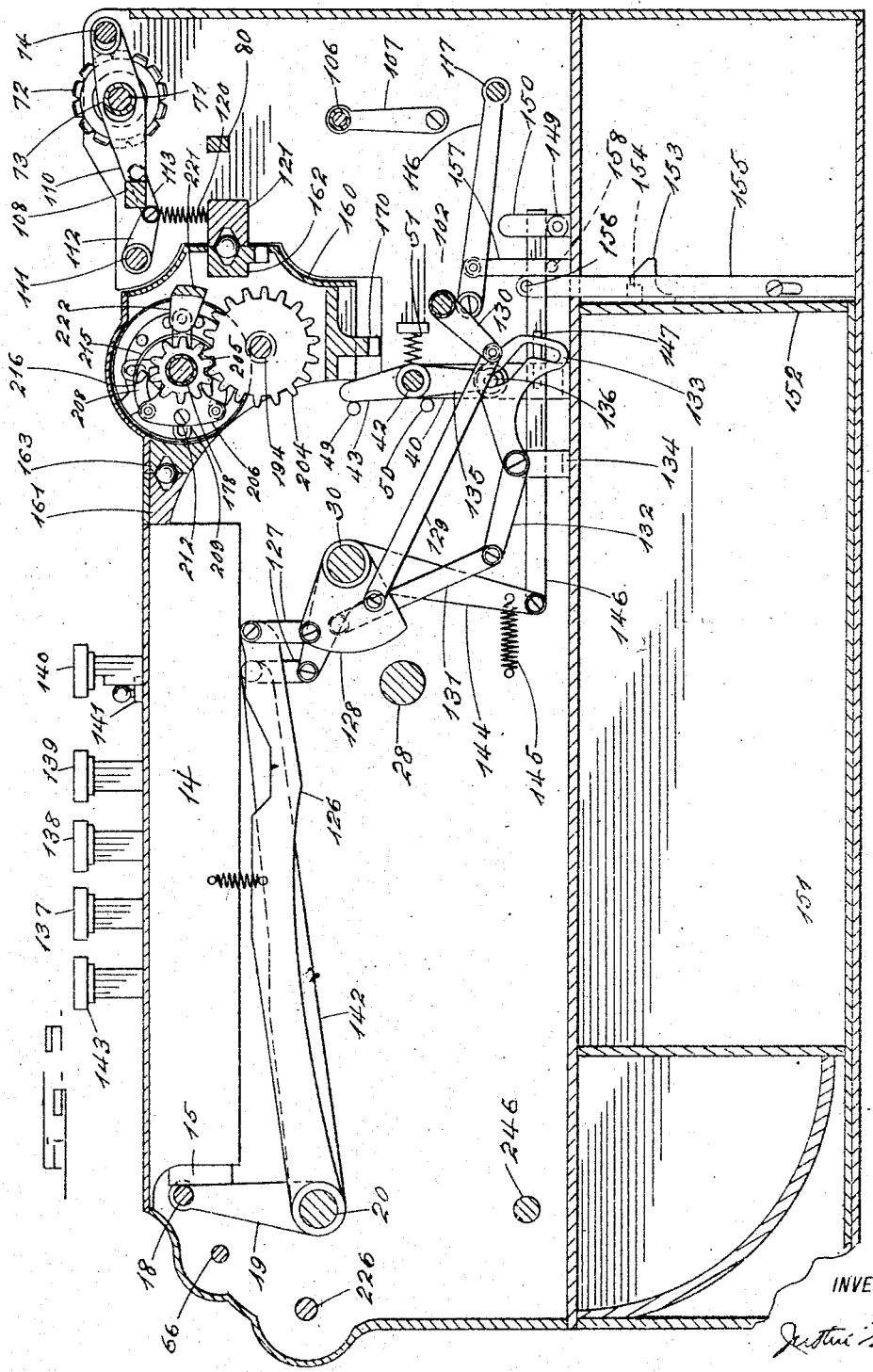
FIG-9-
INVENTOR
Justin Hurley March 9, 1926.  
J. T. HURLEY  
1,575,835  
MULTIPROCESS REGISTER  
Filed Oct. 30, 1923  10 Sheets-Sheet 8

INVENTOR  
Justin T. Hurley

March 9, 1926.
J. T. HURLEY
1,575,835
MULTIPROCESS REGISTER
Filed Oct. 30, 1923
10 Sheets-Sheet 9
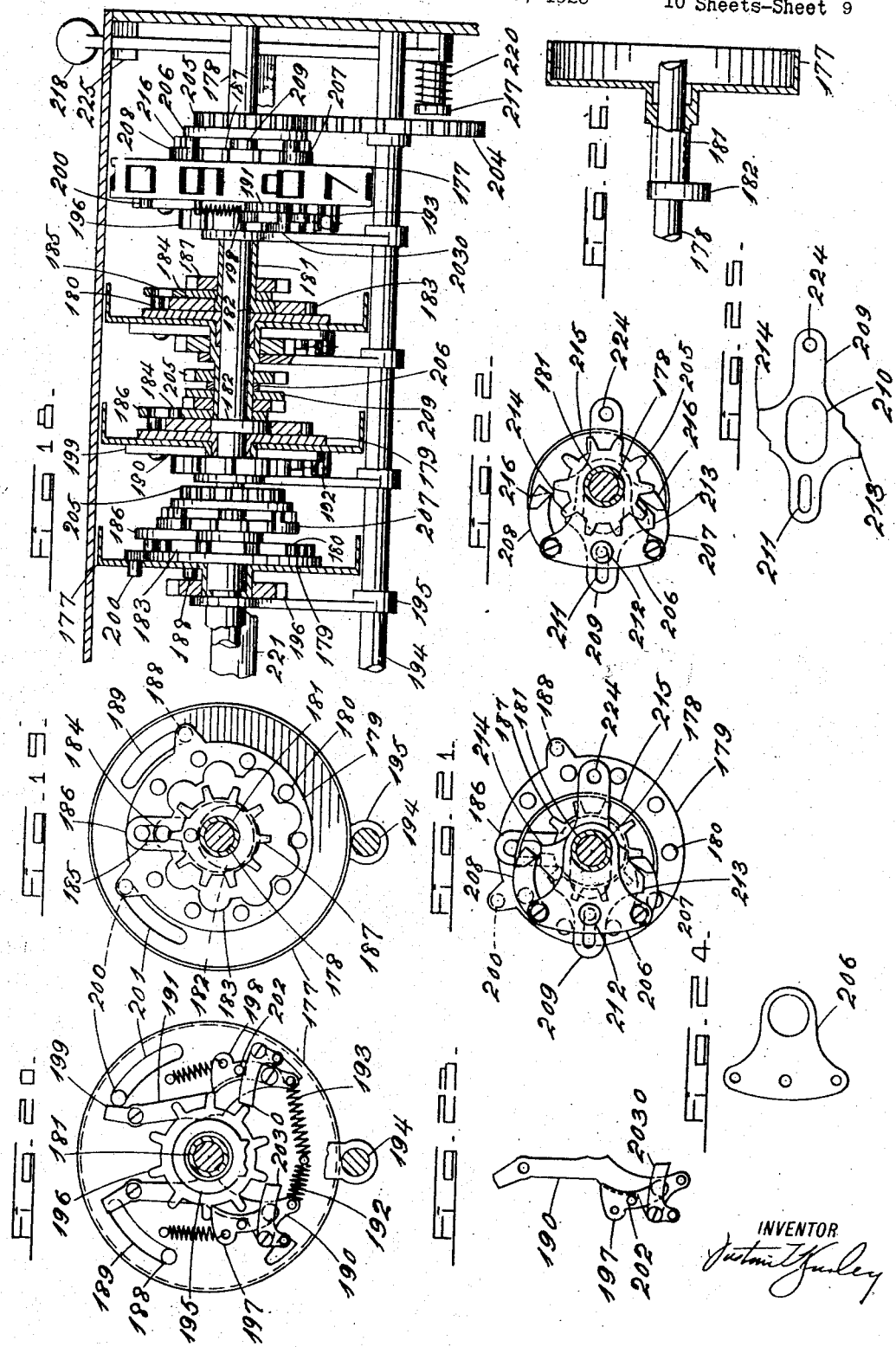

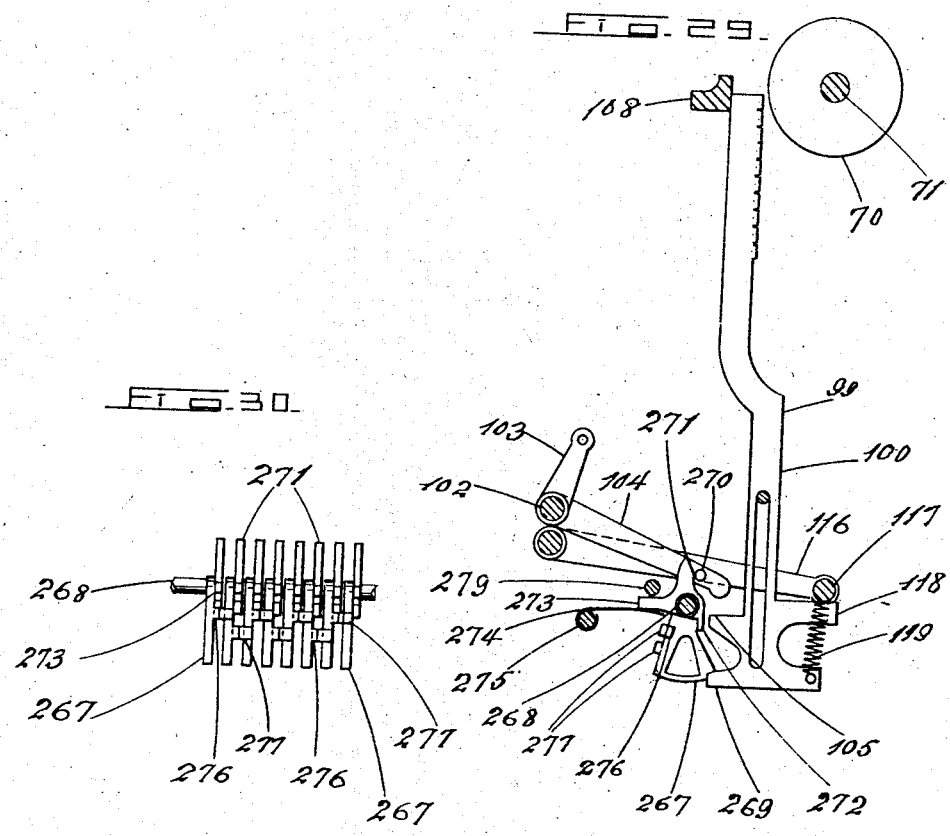

Patented Mar. 9, 1926.

1,575,835

UNITED STATES PATENT OFFICE.

JUSTIN T. HURLEY, OF NEW YORK, N. Y.

MULTIPROCESS REGISTER.

Application filed October 30, 1923. Serial No. 671,754.

*To all whom it may concern:*

Be it known that I, JUSTIN T. HURLEY, a citizen of the United States of America, and residing at New York, in the county of New York and State of New York, have invented new and useful Improvements in Multiprocess Registers, of which the following is a specification.

My invention relates to machines for direct acting computation in the four mathematical processes in conjunction with registering and listing features. The machine herein illustrated and described and embodying my invention comprises a key-board having the key columns arranged in the usual manner, the keys of which may be depressed simultaneously in the several orders and each column of keys is flexible with respect to adjacent keys of the column. It is arranged that the key-controlled differential mechanism may operate conjointly with the listing or printing mechanism, or may be conveniently isolated therefrom, and also that the listing devices may be operated without influencing the totalizer wheels which are arranged in a transversely movable carriage. The machine also comprises a series of "multiplicand" dials, disposed at the foot of the key columns, which indicate the sum set up on the board. The machine also comprises a series of dials arranged adjacent to and aligned with the multiplicand dials and known as the "multiplier", and adapted to show the multiplier in multiplication and the quotient in division. The machine being direct acting there is required but one setting up of the multiplicand for multiplying and one setting up of the divisor in dividing operations, the results of such processes being read at a glance from the three sets of dials, that is to say, from the multiplicand, the multiplier and the totalizer. For addition and multiplication the totalizer wheels turn toward the operator, while for subtraction and division they turn from the operator; therefore the necessity for mentally assisting the machine by laboriously compiling complements for each sum is obviated. The machine furthermore comprises devices which cooperate with the differentials for the reception and registering of cash, received on account, paid-out and charge transactions and will print the designating symbol of the different transactions together with the amount involved, while for obtaining a total or sub-total of such listed sums the machine may if desirable be operated rapidly in a key-driven manner.

The objects of my invention are to provide mechanically a direct-acting registering machine in which the totalizer dials can be driven in either direction as required and will supply at all times a true indication of the result of a process without the employment of complements; to provide a machine having "multiplicand" dials conveniently located at the foot of the key-board, which dials will indicate in additive processes each item before being accumulated on the totalizer or printed on the listing strip, and which will indicate subtotals and totals for comparison with the totalizer and prior to printing on the strip; to provide, in substractive processes, for indicating on the "multiplicand" dials the minuend to be entered on the totalizer and then indicate the subtrahend developed by the keys; to provide in additive processes for printing subtotals and totals as read from the totalizer without changing the reading on the totalizer; to provide in subtractive processes for printing of first, the minuend, then the subtrahend, without influencing the totalizer and permitting the remainder to remain on the totalizer or to be erased concurrently with its listing; to provide in multiplying processes for indicating on the dials the multiplicand as laid down on the key-board, and to indicate on multiplier dials located at the front end of the machine the multiplier as it is developed on successive dials conforming with the step by step advance of the totalizer carriage; to provide for printing while reading directly from the dials, first, the multiplicand, next the multiplier and finally the product, which may be erased from the totalizer concurrently with listing, or left thereon subject to further operations; to indicate in division, the divisor, on the "multiplicand" dials and on the multiplier dials the quotient as developed; to provide for printing from the dials the dividend, the quotient the divisor and the remainder, the dividend being printed when developed on the key-board; to provide for operating the totalizer without operating the listing mechanism and for operating the listing mechanism independently of the totalizer; to provide for turning the multiplier crank in the same direction for both multiplication and division, and for reversing said crank to correct the error when the machine has been over-actuated; to provide reversible multiplier dials which are constantly aligned with the multiplicand dials and with the key columns; to provide an error key which when moved in one direction clears the key-board and prevents keys from latching, and when moved in another direction prevents release of the set differentials by the main operating lever and permits of the "multiplicand" being repeatedly listed; to provide devices for the registering of and depositing of moneys, the said devices including special keys for designating the various transactions by printed symbols, said registering devices co-operating with the differentials for the listing of each sum and including one or more clerk keys for selecting the till to be subsequently released by the main lever; to provide a totalizer having a novel cam-controlled planetary transfer mechanism, together with devices that positively lock the digit wheel in both directions after each operation, and to provide for reversing the digit wheels for addition and multiplication as distinguished from subtraction and division.

I attain these objects by the mechanism illustrated in the accompanying drawings, in which—

Figure 13:
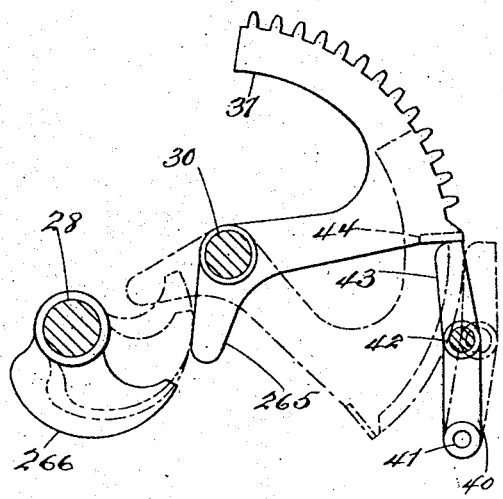
Figure 14:
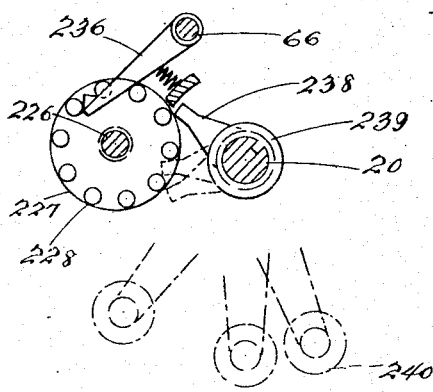
Figure 15:
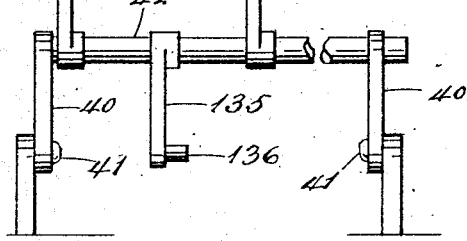
Figure 16:
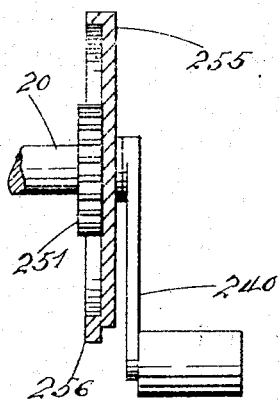
Figure 17:
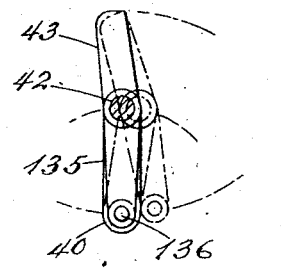

Fig. 1 is a plan view showing the preferred arrangement of the key-board, dials and printing devices; Fig. 2, a plan view beneath the top casing; Fig. 3, a right side view of the machine in its casing; Fig. 4, a vertical sectional view just inside the right-hand casing; Fig. 5, a vertical view approximately on a line with the units key column; Fig. 6, a view of the main operating lever; Fig. 7, an elevation near the front end of the machine; Fig. 8, a view at the front end of the machine; Fig. 9, a sectional elevation near the left side of the machine illustrating the till and controlling devices therefor; Fig. 10, a sectional view of the multiplier dial zeroing device; Fig. 11, a view of a multiplier dial and zeroing device; Fig. 12, a broken view of the multiplying and dividing planetary device; Fig. 13, a view showing the sector controlling frame and the positions assumed by the multiplying cam; Fig. 14, a view of a multiplier finger showing the positions assumed when operating; Fig. 15, a detached view of the sector controlling frame; Fig. 16, a sectional view of the pinion supporting disk associated with the planetary multiplying drive; Fig. 17, a view showing the positions assumed by the sector controlling frame; Fig. 18, a front view of the totalizer; Fig. 19, a view of the digit wheel from the lower order side; Fig. 20, a view of the digit wheel from the higher order side; Fig. 21, a view of the totalizer reversing device; Fig. 22, a detached view of the reversing device; Fig. 23, a detached view of a transfer arm; Fig. 24, a view of the plate for supporting the driving pawls; Fig. 25, a view of the plate for reversing the drive pawls; Fig. 26, a detached sectional view of the digit wheel and attached eccentric; Fig. 27 is a plan view of the multiplier shift; Fig. 28, a plan view showing the arrangement of the multiplier fingers. Figs. 29 and 30 are detached views of devices for controlling the type-bars for the printing of ciphers.

Similar figures of reference indicate similar parts throughout the several views.

The differential mechanisms shown herein and which I will describe briefly, may be found in applications filed by me, Serial Nos. 571,078 and 618,007. In the present disclosure there are included eight sets of differentials, although it will be understood that the capacity of the machine may be increased. Each of said sets of differentials is operative by a column of keys designated 1. The keys, as shown in Fig. 5, reciprocate in longitudinally partitioned housings 14 and are adapted to be latched, when depressed, by a detent plate 15 which is to be engaged by a latching stud 16 that extends through the key stem. A key-release bar 18 extends across the machine adjacent to the ends of the several detent plates 15 and is supported at either end by arms 19 that are pivoted on the cross-shaft 20.

The bar 18, when operated, displaces the detents toward the rear of the machine sufficiently to release the keys which will then be restored by springs 21 secured to the housing partitions. An error key 23, Figs. 4 and 7, is adapted, in the event of error in setting the keys, to operate the bar 18 and clear the key-board. The main operating shaft 28 extends transversely across beneath the differentials and is journaled at either end in the machine frame.

On the cross-rod 30 are arranged loosely a series of plates 29, each of which is connected by a link 31 to a bell-chank 32 of a series that are pivoted on the shaft 20. To each bell-crank 32 is pivoted a key-operative differential bar 33, which at its other end is connected by a short link 34 to the plate 29. Upon depression of a key the bar is engaged thereby and swung downwardly a distance commensurate with key value and must be checked against over-actuation when the key reaches the latching point. Provision against such over-actuation is made by including a limiting member 36 which, in this instance, is arranged with one end slidable on the shaft 20, while the other end is pivoted to the plate 29, whereby when the bar 33 moves downwardly under key impact the member 36 moves upwardly and engages the key end at the instant the key latches. The differential device will then be locked against movement in either direction until the latched key is released.

Arranged on the cross-rod 30, alongside the plates 29, is a series of actuators or sectors 37, each of which is connected to a plate 29, by a spring 28 and normally rests upon a stud 39 that projects laterally from the plate 29. A frame consisting of the side pieces 40, pivoted at 41, carries pivotally, a rocking shaft 42, to which is secured upwardly disposed fingers 43, one of which normally engages under a lug 44 on each sector, thus retaining the sectors at normal when the differentials are displaced. With the sectors held at normal by the fingers the differentials may be operated at will and released by key 23 without influencing the totalizer.

Loose upon the shaft 28 is the main operating lever 45, to which is secured a wing 46, having a wiper extension 47 the function of which is hereinafter described. In slot and pin connection with the wing 46 is a link 48, whose other end is pivoted to the rock shaft 42. When lever 45 is pulled toward the operator and just before attaining full displacement, it will move the link 48, and swing the frame 40 as shown in Fig. 13, whereby the fingers 43 will be displaced to release the sectors 37. If when such release is made the differentials are at normal there will be no movement of the sectors. If however, any of the keys are set the sectors for such displaced differentials will be instantly drawn against the stud 39 by action of spring 38. An extra finger 43 located near the left side of the machine, Figs. 2 and 9, is secured to the shaft 42 and rests normally against a fixed stop 49. Against a stop 50 the frame piece 40 is normally held by a compression spring 51.

Near the right-hand side of the machine, Figs. 1 and 4, is located a swinging key 52 which is pivoted, as shown, in the machine frame. This key 52 which is known as a non-print or add-repeat key carries the symbol "N" and is restored by a compression spring 53. The key 52 rests against a stud 54 fixed in a wing 55 which is pivoted in the machine frame. The wing 55 is connected by a link 56 with a bell-crank 57, pivoted on the rod 30 and having one terminal resting normally against a stud 58 that extends from the side of link 48. It will be seen that if key 52 is struck it will move link 48 to displace the fingers 43 and release the sectors 37, thus dispensing with the service of lever 45 in performing this function. When it is desired to enter a sum or sums on the totalizer without listing such sums the main lever 45 is not operated. Instead the keys 52 and 23 are utilized. First the differentials are set to the amount desired and the keys latched by detents 15; next the sectors are released by operation of key 52, then the keys should be released by pulling the error key or lever 23 toward the operator. In this manner sums may also be deducted from the totalizer without operating the printing devices, but the wheels should first be set for subtraction by devices hereinafter described. From the above example it will be seen that if key 52 is held depressed by a simple catch that is not shown herein, and the error key pulled toward the operator and left in this displaced position the keys operated will not latch, and the sectors being free, will move in both directions along with the plates 29. In this manner a rapid key-driven structure with direct action totalizer for the four mathematical processes, without the use of complements, may be evolved. Results obtained operating a machine by the key-driven method, being sometimes erroneous and requiring verification, are not comparable with the key-set mode of operation described herein.

The error key 23, which as observed in Fig. 4, normally stands vertically, is adapted to be set in either of two operating positions, or in other words has two functions. When pulled toward the operator the detent plates 15 are operated, as explained, to release the keys. When the key is pushed rearwardly as far as it will go the bar 18 is moved forwardly a distance determined by the length of the slot in the link 59 that connects the key to the bar. Movement of key 23 to the rear readjusts certain parts to clear the sectors and render the lever 45 ineffective for releasing the keys, an arrangement required particularly when the machine is to be used for repeating on both the listing strip and the totalizer an amount set on the key-board. Pivoted to the framework near the right-hand side of the machine is a tappet 60, which pivotally supports one end of a horizontal link 61, Figs. 2 and 4, the free end of which is normally adjacent to one end of the link 48. The other end of link 61 is pivoted to a downwardly extending portion of the right-hand arm 19 of the key release bar 18, as shown more distinctly in Fig. 7. A pivoted, spring pressed arm 62, resting against a stud 63 in the side of link 61 and stopped in one direction by a fixed stud 64, holds the bar 18 in normal position adjacent to, or in actual contact with the detents 15 without exerting pressure thereon. Ordinarily when lever 45 is pulled forward toward the operator the wiper 47 wipes over the head of tappet 60 to a point operatively beneath and as said lever restores, its final movement will tilt the tappet upwardly to move the link 61 forward to swing the bar 18 against the detents and release the keys, said release being effected after the printing mechanism is operated. Approximating the end of the first half of its excursion the lever 45, through link 48, will displace the fingers 43 and release the sectors which will instantly conform to the positions of the adjusted differentials, whereby, when the lever 45, on the last half of its excursion, passes to normal and releases the keys, the differentials will at once drive the sectors home to add the sum to the totalizer.

When key 23 is pushed backwardly, as above described, the link 61 will displace the link 48 to clear the sectors. In so doing, the tappet 60 is swung downwardly out of the path of the wiper 47. At this time, the keys not having been set, the sectors stand at normal. If the multiplying devices, later to be described, are now adjusted for operation the sectors will thereby be locked at normal. The differentials may now be set to the required amount, with consequent latching of the keys. The lever 45 should now be operated as many times as it is desired to repeat the sum on the listing strip, a process which means listing without adding. The multiplier should next be operated as many times as the lever 45 has been, after which the totalizer will indicate the sum of the repeated listing. The keys may now be released by key 23, after which the sum showing on the totalizer may be set up on the board, and the totalizer set for subtraction. The multiplicand dials, later to be described, may be read for verification with the totalizer. Upon pulling the lever 45 a total of the repeated listings will appear on the strip and the totalizer will indicate zero. Should it be desired to retain on the totalizer the sum of the repeated listings a special non-add or sub-total key, yet to be described, will hold the sectors against displacement when the total is printed on the strip.

The dials 65, known as the "multiplicand" and adapted to indicate at all times the positions of the differential mechanisms are pivoted on a cross-rod 66, Figs. 5 and 8, fixed in the frame-work, and are each provided with a pinion 67, which is constantly meshed with a sector 68, Figs. 2, 5, 7 and 10, that is integral with the bell-crank 32. The indications of dials 65 may be read through openings 69, Figs. 1 and 10.

For the printing or listing mechanism is provided a platen 70 rotatable and slidable on a fixed cross-rod 71. The slight elevation of said platen above the key heads permits ready inspection of the printed work. To provide for lateral movement and facilitate angular movement for adjusting the platen is provided a knob 72 which connects by a sleeve 73, on rod 71, with the platen 70, to which it is affixed, Figs. 1, 4, 5 and 9. Another fixed cross-rod 74, at the rear of the platen carries, slidably, the end plates 75 and 76, which are in fixed connection with each other by a sleeve 77, slidable on the rod 74 and are further supported by rod 71 which extends therethrough. Below the platen and in contact therewith is a roller 78, supported by the end plates 75 and 76 and adapted to guide the listing strip in a manner commonly employed. The plates 75 and 76 are additionally braced beneath the roller 78 by a tie bar not shown herein, and to this tie bar is pivoted a pawl 79 which is spring pressed against equidistantly spaced saw-tooth formations on the upper side of a transverse bar 80 that is fixed in the machine-frame. The function of pawl 79 is to permit correct alignment of the printed column with the type-bars when the platen is fed transversely of the machine by knob 72. Fixed to the sleeve 77 are two upwardly inclined supports 81 and 82, which terminate as shown in Figs. 1 and 5, at a point higher than the surface of the platen, one at each end thereof, and which carry pivotally, the guide arms 83 and 84 that are to rest upon the listing strip when said strip slides over an apron 85 pivoted coaxially with said guide arms and resting upon the platen.

After receiving the imprint of the type-bars, the paper will be fed one step upwardly in view of the operator by means which I now describe. Attached to the right-hand end of platen 70 is a ratchet 86, engaged by a pawl 87, mounted on a support 88, which is fixed to a hub that passes through the end plate 75. Fixed to said hub is a downwardly inclined arm 89, in which is fixed a short rod 90. The other end of rod 90 is fixed in an arm 91 which is slidable upon the rod 71, Figs. 1 and 5. The parts 86, 87, 88, 89, 90 and 91 move transversely with the platen. One end of an upwardly inclined feed link 92 is loose upon the rod 90, allowing said rod to slide readily therethrough with transverse movement of the platen. The other end of link 92, Figs. 2, 4 and 5, is pivoted to an arm 93 which is fixed to a sleeve 94 that oscillates on a short stub or rod 95, fixed in the right-hand frame of the machine. Referring to Figs. 2 and 4, it will be observed that to the right end of sleeve 94 is fixed an arm 96, to which is pivoted a link 97 that connects to the wing 46 of the operating lever 45. Each excursion of lever 45, will, by the elements described, reciprocate the rod 90, by which means the pawl 87 will advance the platen one step.

Mounted to swing on the rod 74 at the rear end of the machine and movable transversely with the platen, is a pendent carrier 98, adapted to hold the paper roll in a manner commonly employed, and the paper which unwinds therefrom is to be carried between the roller 78 and the platen, being fed upwardly over the apron 85.

To correspond with the number of key columns there is provided a series of type-bars 99, one, the farthest to the left, representing a total or non-add key and also the keys for certain monetary transactions. These typebars rest upon a rod 100 that is fixed in the end supports 101, Fig. 2. On a transverse rod 102 is pivoted a series of arms 103 that are connected by sleeves, Fig. 2, to their respective determinator arms 104, each having its free end resting normally on a forwardly projecting extension 105 of each type-bar. The arms 104 are bent in a manner that will cocentrate their free ends appropriately over the extensions 105 of the serried type-bars. A link 1050 connects each arm 103 to its corresponding plate 29 of the differential mechanism.

A roller 106, supported in spring-pressed arms 107, holds the type-bars normally out of contact with the platen and against a pressure bar that is supported at ether end by plates 109 and 110, which are arranged to have reciprocating motions over the supporting rods 71 and 74. A transverse rocking shaft 111, journaled in the machine frames, has fixed thereto a right and a left-hand arm 112, to each of which is pivoted a link 113 whose opposite end is pivoted to the pressure bar 108. To the end of the right-hand arm 112 is pivoted a vertical link 114, which is in slot and pin connection with an arm 115, that is rigidly fixed to the sleeve 94. The arm 115 has its counterpart 116 pivoted to the left-hand framework, Figs. 2 and 9. Supported in the arms 115 and 116 is a type-bar lifting rod 117 which normally rests on the rearward extension 118, provided on each type-bar and is resiliently connected to said type-bars by springs 119. The right and left-hand toggles formed by members 112 and 113 are normally held in inoperative position by a spring 120, Fig. 9 that connects to a ball-race bar 121 fixed in the right and left frame-work of the machine. Ribbon reels 122 and 123 are pivotally supported by the bar 121, as shown in Figs. 4 and 5. Referring to Figs. 1 and 5, it will be observed that the pressure bar 108 carries two rearwardly projecting members 124, which are provided with slots through which passes the ribbon 125 from reel to reel across the face of the type-bars.

The determinator arms 104 are adapted upon key action, to be swung radially upward from normal and set in either of nine possible positions as determined by the position of plate 29, and when so set, the operating lever 45 will be pulled to lift the rod 117, whose range of sweep is somewhat greater than the arm 104 in its ninth position. The type-bars 99, impelled by spring 119, will move upwardly until stopped by contact with the arm 104, at which time the appropriate type figure will be at the printing point. Assuming that an arm 104 is in the highest or ninth position, said arm will be engaged by the extension 105 at the time the arm 115 acquires an elevation sufficient to displace upwardly the link 114. When so displaced, the link 114 will operate the toggle, shift the bar 108 to the rear and thereby force the type-bars against the platen with considerable pressure. The forward movement of lever 45 having displaced the fingers 43, the sectors whose differentials have been set will have fallen against the studs 39. Restoring movement of lever 45 will first release the toggle which will be positively restored by spring 120, and the type-bars under pressure of roller 106, will be moved away from the platen. With advance movement of the ratchet feed link 92 the pawl 87 is given a lead over the ratchet which is adequate to permit release of the toggle prior to line spacing of the platen by said pawl. The rod 117, after restoring sufficiently to restore the toggle, will re-engage the extension 118 to restore the type-bars. The amount shown on the multiplicand dials will in this operation be entered on the totalizer with restoration of the differentials. It should be explained here that in additive processes the last half of the excursion of the sectors operate the totalizer, while in subtractive processes it is operated on the first half of the sectors excursion.

Referring now to Figs. 1, 2, 7 and 9, it is seen that a spring-retracted differential bar 126, loose on the shaft 20 is connected by a short link 127 to a wing 128, which is loose on the rod 30. A link 129 connects the wing 128 with an arm 130 sleeved on the rod 102 and which is adapted to operate the determinator arm 104 associated with the type-bar 99, at the extreme left of the series, Fig. 2. Another link, designated 131 connects the wing 128 to an arm 132, which is integral with a box-cam member 133 and pivoted to a support 134. Alongside, at the left of cam 133, is fixed to the rock-shaft 42 a downwardly extending finger 135 provided with a lateral stud 136 adapted to the box-cam 133.

To differentially operate the bar 126 there are arranged on the key-board four keys designated respectively from front to rear 137, 138, 139 and 140, the first three referring to monetary transactions with respect to a normally inaccessible till described below. Each of these four keys has a representative symbol on the type-bar corresponding to bar 126. There is a slidable catch 141 provided for holding the key 140 in depressed position during certain operations. At the left of bar 126 and loose on the shaft 20 is a bar 142 operative, in this instance, by a single clerk-key 143 which bears the symbol "A." This bar 142 is likewise connected by a link 127 with a bell-crank 144, pivoted on the rod 30 and retracted by a spring 145, Fig. 9. To the lower terminal of bell-crank 144 is pivoted a horizontally slidable till selecting bar 146, provided on one side with a lug 147 and on the other side supplied with a lug 148 and having its free end resting on the roller 149, in a fixed guide 150. A till 151, Fig. 9, arranged beneath the base of the machine proper is adapted to be pressed forwardly by a compression spring such as is commonly employed for the purpose, and which will press from the rear casing of the machine against the end 152 of the till. To the end 152 is secured a beveled nose catch 153, which is normally engaged by a lug 154, secured to the latch-bar 155, said bar extending upwardly through the floor of the machine and being provided at its upper extremity with a lateral stud 156. Pivotally suspended from the arm 116 is a hanger 157 supplied with a lateral stud 158.

The key 137 bears the symbol "P", indicating that it is to be utilized in a transaction where money is paid from the till, and upon depression of this key the cam 133 will displace the finger 135 to the full extent of its throw—that is to say, to the position shown in dotted outline in Fig. 17, the stud 49, Fig. 9, meanwhile acting as a fulcrum for the rearward movement of shaft 42 against the compression spring 51. Thus the fingers 43 will, in this operation, remain engaged to hold the sectors at normal, but the symbol for this key will be listed along with the amount involved. For key 138 representing charged transactions, the mechanism will function as for key 137, but the symbol for key 138 will print along with the sum. For key 139 the symbol will print, but as the action of this key does not displace the finger 135 the shaft 42 will be displaced by lever 45 to the dotted position indicated in Fig. 13, to enter the amount on the totalizer. Key 139 is useful in summing up received on account transactions for the business day and printing such total with the appropriate symbol. In fact a total of each kind of transactions may be made on the machine and listed along with the designating symbol, and these totals may be summarized and printed as a gross total. After latching one of the transactions keys above described, the key 143, bearing the symbol, "A" will be pressed to latch, thereby advancing the bar 146 to locate the lug 147 under the stud 158 and the lug 148 under the stud 156, whereby upon operation of lever 45 the hanger 157, rising with arm 116, will lift the bar 146 and through lug 148 acting against the stud 156 lift the latch bar 155 to release the till. It will be understood that more than one till and more than one clerk key may be included in the machine, and also that a type bar for the clerk keys may be installed to show how many times each clerk operated the till or tills.

A detent plate 15 latches the key 143 and another plate 15 latches keys 137, 138, 139 and 140, the keys will therefore restore by bar 18. Key 140, in displacing bar 126, will cam the finger 135 rearwardly to its fullest extent and displaces the cam 133 slightly farther than does keys 137 and 138, whereby the shaft 42 is moved rearwardly as in Fig. 17 to render link 48 ineffective. Key 140, which is known as a non-add or total key, is also represented by a symbol on the type-bar corresponding to bar 126, and the function of said key is to prevent operation of the totalizer when it is desired to list a sub-total. If it is desired to clear the totalizer when printing the total of a column, the wheels will be set for subtraction. When it is desired to hold key 140 against release by bar 18, as e. g., when the differentials are to be reset to various amounts, such sums to be listed without adding, the catch 141 may be utilized to hold said key depressed.

160 designates the totalizer carriage which runs on ball bearings operative in races 121 and 161, fixed in the machine frame and which have counter-parts 162 and 163 fixed to said carriage, as shown in Figs. 4, 5 and 9. A spring-pressed pawl 164, pivoted on a downwardly extending flange 165 fixed to the under side of race 121 engages notches formed on the under side of race 162 with the object of holding the carriage properly aligned with the key columns. Journaled in supports 166 and 167 near the middle of the machine and in a plane below the differential mechanism, is a shaft 168 arranged longitudinally of the machine and provided with a gear wheel 169 that meshes with a rack 170 fixed to the under side of said carriage. The shaft 168 extends through the front casing of the machine and at that end is provided with a sleeve 171 which is splined longitudinally to said shaft, and to which is fixed, outside the front casing, an operating handle 172. On the rearward end of sleeve 171 is fixed a follower plate 173, which is provided with a pointed stud 174, adapted to engage in any one of a series of equidistantly spaced openings 175 that are arranged in a circle in the support 166, with the shaft 168 at the center. A compression spring 176, mounted on the sleeve 171, rests against the front casing of the machine and presses the follower 173 against the support 166. The normal position of carriage 160 is that illustrated in Fig. 1, where the units digit wheel is aligned with the units column of keys. In adding and subtracting processes the carriage 160 should remain at normal. When it is desired to move the carriage in either direction the controlling handle 172 will be pulled forwardly to remove the stud 174 from the opening 175 after which the carriage may be moved in either direction by turning the handle and positioned with the assistance of pawl 164.

The digit wheels in Fig. 18 are illustrated in skeletonized sectional formation with the object of avoiding obscurity. The digit wheels 177 and accessories are mounted on a rod 178 that extends throughout the series and is mounted in the carriage end plates. Associated with each wheel 177 is a wheel 179, having an internally toothed gear consisting, in this instance, of lateral pins 180 arranged in a circle of ten, said wheel being known as a communicating wheel from the fact that it communicates to its digit wheel both driving and transfer motion. Each digit wheel is provided with a lengthened hub forming a sleeve 181, to which is fixed an eccentric 182 arranged axially within an externally toothed gear plate 183, Fig. 19, appropriate to the higher order wheel and which operates its associated pin-gear wheel 179. Transfer connection from each digit wheel to the next higher set is thus established. A stud 184 secured to the face of plate 183, reciprocates in a slot 185 provided in a driving arm 186, which is fixed to a ratchet wheel 187 that rotates on the sleeve 181. The ratio of teeth on gear 183 is to the teeth or pins 180 on wheel 179 as 9:10 which implies that a complete revolution of eccentric 182, while the arm 186 remains stationary, will cause the gear 183 to rotate the wheel 179 through thirty-six degrees, the stud 184 meanwhile reciprocating in the slot 185. Regardless of the position of eccentric 182 the ratchet 187, when driven by the operations of sector 37, will in a like degree rotate the gear-plate 183 and thereby the wheel 179, whose motion will be communicated through digit wheel 177, eccentric 182 and gear 183 to wheel 179 of higher order. This transfer movement to wheel 179 will be continuous with movement of the lower order digit wheel.

Obviously if wheels 177 were integral with wheels 179 this continuous transfer feed, simultaneously with driving actuation of ratchet 187, next lower in the order, would carry one digit out of view from the reading point, and the indication would be blank until upon additional actuation of said ratchet 187 another digit was caused to appear. An important feature of my improvements is the provision of means for aligning and holding the appropriate digit in view at the reading point until wheel 179, having progressed one tenth in either direction, communicates its position to its associated digit wheel, resulting in immediate appearance at the reading point of the digit corresponding to the position attained.

Referring particularly to Fig. 20 which illustrates the higher order side of the digit wheel, it will be observed that a stud 188 extends from the face of wheel 179 through an arcuate slot 189, provided in the web of the digit wheel. With the parts at normal and wheel 177 standing at 0, the stud 188 will be located near the left-hand end of slot 189. Arms 190 and 191 are pivoted to the digit-wheel web, one extending to the left and the other to the right of the sleeve 181 and are normally drawn toward each other at their free ends by springs 192 and 193 that have a common anchorage point on the digit-wheel web. Fixed to a rod 194 which is secured in the carriage end-plates and extends beneath the digit-wheel series, are brackets 195, one appropriate to each digit-wheel, and to each of said brackets is secured a ratchet disk 196 that encompasses the sleeve 181. To the arm 190 near its free end, is pivoted a pawl 197, and similarly the arm 191 carries a pawl 198, both of said pawls being spring-pressed as shown, against the ratchet 196. Integral with the arm 191 is an extension 199 which when the wheel stands at 0, is in contact with a stud 200 that extends from the wheel 179 through the arcuate slot 201, formed in the digit-wheel web. An extension similar to the member 199 is supplied to the arm 190 and is to be engaged at times by the stud 188.

Pawls 197 and 198 are each provided with a pin 202 which extends across the outer edge of their supporting arms 190 and 191, and will therefore be moved clear of said ratchet 196 when the arm is fully displaced. At other times when the arm is at normal, the pawl is adapted to swing radially on its pivotal point when drawn back over the ratchet teeth. In the absence of driving or transfer movement to operate wheel 179 the digit wheel will remain locked against movement in either direction, by said pawls 197 and 198. In Fig. 20 the position of parts show that the arm 191 has been displaced by the stud 200 to disengage the pawl 198 from the ratchet 196, which will allow the spring 193 to turn the wheel 177 in counter-clockwise or subtractive direction. Should the stud 200 in this instance, be actuated by transfer only, the pawl 198 will engage the next tooth of the ratchet 196 and stop the digit wheel. The teeth of ratchet 196 when engaged by pawl 198, prevents rotation of wheel 177 to the left, Fig. 20, but permits rotation to the right when wheel 179 is advanced in the additive direction by transfer motion, or by concurrent transfer and driving action, whereby the stud 188 will displace the arm 190 to disengage pawl 197 from the ratchet teeth, permitting the now extended spring 192 to flick the wheel around. Should the displacement of arm 190 be caused by transfer movement only, the pawl 197 will engage the next tooth of the ratchet. When such displacement is caused by transfer action, plus the drive imparted by depression of key one, the pawl 197 will engage the second tooth of the ratchet.

When being operated by transfer only, communication of movement from wheel 179 to wheel 177 will be intermittent, and although wheel 179 may be moving continually, the digit wheel will indicate the last ordinal position until wheel 179 has attained a lead sufficient to lift pawl 197 from the ratchet. The functions of arms 190 and 191 are similar. The former may be referred to as the plus arm and the latter as the minus arm. When the next lower order digit-wheel stands at 0 and the digit-wheel Fig. 20, stands at plus 1, the studs 188 and 200 will stand removed from the left-hand ends of their respective slots a distance which is equal to the distance in which wheel 179 will be moved by minus movement of the lower order digit-wheel from 0 to 9. The position assumed by arm 191 in Fig. 20, shows that such minus movement is being made, the pawl 198 being free of ratchet 196 to permit the spring 193 to move the digit-wheel to 0, after which the extension on arm 190 will rest against the stud 188 and the digit-wheels will now indicate 09. By advancing the lower order digit-wheel from 9 to 0, the stud 188 will displace arm 190 of Fig. 20 and the spring 192 will move the digit-wheel to plus 1. Stops 2030, one on each of said arms and controlled in this instance, by slots in the digit wheel web and also by springs if desirable, co-operate with the studs 188 and 200 and with the springs 192 and 193 in supplying rapid and complete movement to the digit-wheels. While I have illustrated and described herein the externally toothed ratchet 196 for co-operating with the arms 190 and 191 in controlling the digit-wheel, it is known that an internally toothed ratchet will answer the purposes and that other planetary devices, one of which is shown in my application, Serial No. 373,522, will co-act with the internally toothed gear-wheel 179 for operating the digit-wheel in the manner described.

Rotative on the rod 194, at the lower order side of each digit-wheel, is a gear wheel 204 which meshes with actuating sectors 37 and remains in mesh with a pinion 205 which is loose on the sleeve 181. Fixed to the pinion 205 is a pawl carrier plate 206, to which is pivoted an adding pawl 207 and a subtracting pawl 208 that are adapted to engage the ratchet wheel 187. A pawl changing plate 209, slidable longitudinally of itself, is provided with an elongated opening 210, through which extends the sleeve 181 on which it slides. In the tail end of plate 209 is provided a slot 211, in which rides a pin 212, that is fixed in the plate 206. The pin 212 is headed on both ends to hold said plates frictionally together. The side edges of plate 209 are formed into disaligned cams 213 and 214. A semi-circular spring 215, looped over the periphery of ratchet 187 presses the pawls 207 and 208 toward said ratchet. It will be observed, in Fig. 18, that the pawls 207 and 208 are offset from their pivotal support in order to align them with the ratchet wheel 187, thereby straddling the space occupied by plate 209. The pawls 207 and 208 are each provided with a lateral lug 216 which extends across the edges of plate 209. The object is to reciprocate plate 209 longitudinally to bring the pawls 207 and 208 alternately as desired, into mesh with ratchet 187 whereby, through operation of pinion 205, the digit wheel and attendant devices will be moved either in the plus or the minus direction as determined.

In the position of parts illustrated in the several figures, with particular reference to Figs. 21 and 22, the pawl 207 is shown in engagement with ratchet 187, while pawl 208 rests inoperatively upon the cam 214. This is the plus position, and the angular reciprocative movement of parts 205, 206 and 209 at each excursion of sector 37 will advance the ratchet 187, driving arm 186, gear plate 183 and pin gear 179, in a degree commensurate with key depression. The normal angular position of plate 209, as illustrated, is horizontal. While in this position said plate will be moved longitudinally rearward to the limit of slots 210 and 211, whereby cam 213 will disengage pawl 207 from the ratchet, and cam 214 will release a pawl 208 into engagement with said ratchet. The reciprocative movements of sector 37 will now operate the digit wheel in the minus direction.

On a headed stud 217, fixed to the right-hand end of carriage 160, is slidably arranged a lever 218 which extends upwardly through the top casing. A compression spring 220 mounted on a headed stud 217, holds the lever 218 normally contiguous said carriage end. A horizontal bar 221, extending rearwardly of the digit wheels, is attached at one end to the lever 218, and at the other end is attached to an arm pivoted to the left-hand end plate of said carriage and coaxially with lever 218. Extending forwardly from bar 221 are noses 222, one of which is parallel to each plate 209. Each nose 222 is provided with a lateral stud 223 Fig. 5, that extends toward the plate 209 and is aligned with an opening 224 provided in the plate 209. The lever 218 is shown in the plus position, and to move it rearwardly to the minus position it must first be moved to the left to clear the fixed retaining lug 225, then to the rear and finally to the right where it will be held behind the lug 225 by the spring 220. Initial movement of lever 218 to the left will engage the stud 223 of nose 222 with the opening 224 of plate 209. Rearward movement of said lever will carry the plate 209 rearwardly to move pawl 207 out of and pawl 208 into operative position, and final movement of said lever, to the right, will release said plate. When restoring said pawls to the plus position movement of lever 218 will be reversed.

Near the front end of the machine is mounted a cross-shaft 226 on which is pivoted a series of multiplier dials 227 each provided with ten lateral operating pins 228. These dials 227, which may be read through the openings 229, are arranged in a slightly lower plane than the multiplicand dials, but are aligned therewith and with the key columns. For the purpose of zeroing there is pivoted on the side of each dial 227 a spring pressed pawl 230, the nose of which projects through an opening in the wheel hub and rests upon the shaft 226 as shown in Fig. 11. The dials 227 are held against lateral movement by frame plates 231. On the left side of the machine, Fig. 8, and fixed to the shaft 226 is a button 232, which is held against the machine casing by a compression spring 233, that presses from said casing against a collar 234. On shaft 226 there is provided a series of taper-end slots 235, positioned normally between the dials 227. When zeroing said dials, the button 232 is pulled to the left to bring the slots 235 in engagement with the pawl noses. Then by turning the shaft 226 against the pawls the dials 227 are turned to zero, after which, as the spring 233 presses said shaft longitudinally to normal, the pawl will ride up the tapered end of said slot and rest upon the surface of said shaft. Spring-pressed pawls 236, pivoted on the rod 66 are adapted to hold the dials so that the reading points will be properly aligned.

Splined upon the multiplier shaft 20, Figs. 2, 5 and 14, are collars 237, to each of which is fixed a multiplier finger 238, adapted to engage the pins 228 in operating the dials 227, but are normally out of operative relation with said dials, excepting the first finger at the left, which when the totalizer carriage is at normal, is held in operative alignment with the pins of the units multiplier dial. Conforming with the step by step movement of said carriage to the right for progressively registering the orders of the multiplicand in multiplying processes, the multiplying dials beginning with the units dial, will indicate successively to the left, an arrangement which corresponds in general with the mental procedure in multiplying, although with the mechanism employed herein, the product may be obtained as readily by beginning with the highest order of the multiplier and stepping the carriage to the left.

The collars 237 are each provided with a flange or rim 239 by which they will be moved longitudinally of shaft 20, but will rotate in either direction by operations of a crank 240, which is secured to the right end of said shaft. Fixed to the carriage operating shaft 168 is a pinion 241, which meshes with a rack 242, transversely movable on rollers 243, that are mounted in fixed guides 244. The rack 242 is provided on its lower edge with a cam 245, Fig. 8. Mounted on a cross-rod 246 are sectors 247, having lengthened hubs 248, each provided with a finger 249 which extends subjacent the rack 242, Figs. 5 and 28. From the connections described it will be understood that the rack 242 moves with the totalizer carriage, but in an opposite direction and with a relatively reduced motion; therefore when the carriage is moved step-by-step to the right the cam 245 will engage the fingers 249 successively to the left and vice versa.

The rectangular head of each sector 247 is provided with a spirally disposed rhomboid depression 250, which operatively accommodates the arc of flange 239, Figs. 5, 7 and 27. Fore and aft movement of the sector as viewed in Fig. 7, will produce right and left hand movement of the collar 237. With the carriage at normal the first or units sector 247 will be engaged by the rack cam 245 and the head of the said sector will then be in rearward position whereby the collar 237 is located in operative position. If the crank 240 is turned around rearwardly, the units dial of the multiplier will be turned one-tenth around at each revolution of said crank, that is to say, if the units multiplier is "3" the crank will be turned three times. By stepping the carriage one order to the right to align the tens digit wheel with the units key column, the units multiplier dial will be rendered inoperative and the tens dial engaged. In this manner each dial may be operated.

For reciprocating the actuating sectors 37 in multiplying and dividing processes is employed a planetary gear or repeating device mounted on the shaft 20 and adapted to drive the main shaft 22. Upon the shaft 20 is fixed a sun gear-wheel 251 that meshes with a planetary pinion 252, to which is coaxially fixed a larger gear-wheel 253, that meshes with an internally toothed gear-wheel 254. The gears 252 and 253 are pivoted to a disk 255 which is rotative on shaft 20 and arranged with its outer face flush with the machine side-casing. When the disk 255 is moved forwardly or to the left, Fig. 12, a peripheral nose 256 thereon will engage the end of a bell-crank stop pawl 257, which is pivoted internally of the machine casing and pressed upwardly by a spring 258. A fixed stop 259 holds the end of pawl 257 out of contact with the disk 255. When disk 255 is rotated rearwardly the nose 256 rides over and beyond the free end of pawl 257. On the outer face of disk 255 is fixed a stud 260, which is normally engaged by a spring-pressed pawl 261, said pawl being pivoted to the crank 240, therefore when said crank is turned rearwardly the disk 255 will move along with it.

With reference to Figs. 2, 4, 7, 12 and 13 it will be noted that a sprocket 262 is fixed to the left face of the internal gear 254 and a similar sprocket 263 is fixed to shaft 28. On these sprockets is mounted a chain 264. Integral with each sector 37 is a nose 265 which will be engaged at proper intervals by its appropriate wiper-cam 266 of the series fixed on shaft 28.

In operating the machine the crank 240 should be turned rearwardly for both multiplication and division. To switch from multiplication to division it is required that the reversing lever 218 be moved from plus to minus position. It has been explained that the plate 255, through the medium of parts 260 and 261, moves rearwardly with crank 240; therefore the gears 252 and 253 will revolve around multiplier shaft 20 without rotating and turn the gear 254 rearwardly on its axis conformably with crank motion. Through the medium of chain 264 the shaft 28 will thus turn rearwardly in unison with crank 240.

In Figs. 12, 13 and 14 it is shown that in the processes of multiplication and division there are three positions to be attained by crank 240, cam 266 and finger 238. The neutral or normal position for these three parts is depicted in full line illustration and represented by the symbol "N". In this neutral position the finger 238 is inclined upwardly clear of the dial pins 228 and cam 266 is free of nose 265. For multiplying purposes the crank 240 should first be turned rearwardly from "N" to "F" to locate the finger 238 in intermediate position beneath one of the dial pins 228 and locate the cam 266 in the intermediate position shown to hold actuators 37 at normal. Set the multiplicand on the key-board and latch the key 52 to clear the sectors. Assuming that the multiplier is to be "123", turn crank 240 rearwardly from "F" to "F" three times. Move the carriage one step to the right and turn the crank twice. Advance the carriage another step and turn the crank once. The multiplicand may then be read from dials 65, the multiplier from dials 227 and the product from the totalizer. Lever 45 may now be pulled to clear the key-board. crank 240 moved rearwardly to "N", and the dials 227 zeroed.

The product remaining on the totalizer may, if desirable, be used for obtaining an additionally increased multiplied product. That is to say, if the product indicated is "27306" and the multiplicand is reset to "246", with a multiplier of "32" the result indicated on the totalizer will be "35178".

When it is desired to clear the totalizer its indications should be set in the key-board, lever 218 placed in the minus position and lever 45 pulled once or if no listed total is required, key 23 may first be moved rearwardly to release the sectors and then moved forwardly to clear the differentials. If it is desired to print the results of a multiplying operation the crank 240 should be left standing at "F", and the lever 45 pulled to print the multiplicand and clear the board. Set up on the board the indications of the multiplier and pull lever 45. Then set up on the board the product indicated on the totalizer; move lever 218 to minus sign; move crank 240 to normal and pull lever 45. This last operation will clear the whole machine.

In a dividing process the functioning of the mechanism is quite similar to that in the multiplying process. The dividend should first be entered on the totalizer, then the divisor set in the key-board, and the carriage moved to the right sufficiently to conform with the first inclusion of the divisor into the dividend. Then turn crank 240 the required number of times, move the carriage one step to the left and repeat. As a result the divisor indicates on the dial 65, the quotient on dials 227 and the remainder on the totalizer. When listing the results of a dividing process the dividend should be printed before operating the crank 240. After operating the crank 240 the divisor, the quotient and the remainder may be printed in the manner employed in printing the results of a multiplying process.

It sometimes happens in a multiplying process that the mechanism is overactuated and must be reversely operated to correct the error. At the termination of each stroke the crank 240 will stand at "F" with the fingers 238 and the cams 266 in intermediate position, the cams holding the sectors at normal after their last excursion, said last excursion having resulted in a one stage overactuation of the totalizer and of the dial 227. To correct the error the lever 218 should be set to minus position. Then from "F" turn the crank 240 completely around, forwardly, overlapping the "F" position and terminating the stroke at "R". This movement will swing the fingers 238 around forwardly and locate them in the third position, resulting in a one-step reversal of the dial 227. Cams 266 will have made a revolution in the normal rearwardly direction and come to a stop in third position. Crank 240 will be turned from "R" to "R" as many times as the machine has been overactuated, as determined from the dial 227. In correcting errors of overactuation in dividing operations the lever 218 will be moved from minus to plus and the subsequent correcting operations will be as for multiplication.

Bearing in mind that the fingers 238 are fixed rotatively to the multiplier shaft 20 and will move in unison with crank 240, I will endeavor to describe succinctly, why the planetary mechanism always rotates rearwardly while the crank may be turned in either direction. In normally rearward direction the pawl 261 in engagement with stud 260 will drive the planetary device en masse. When moving the crank in the reverse or forward direction the coaxially pivoted gears 252—253, actuated by the sun gear 251 fixed on shaft 20, will have a slow orbital revolution forwardly and a slow axial rotation rearwardly, the combined movements permitting swing of crank 240 from "F" to "R" to locate the fingers 238 and cams 266 in third position without moving the gear wheel 254. At the "R" position the nose 256 on disk 255 will be in contact with the end of pawl 257. At this point the disk 255 will be stopped while crank 240 is turned around forwardly. The forward revolution of crank 240 from "R" to "R" will now produce rearward rotation of gear 254 and with the same velocity, to operate the cam 266.

If preferable the position "R" of the planetary devices may be dispensed with and the start and finish of reverse clockwise movement of crank 240 made at "F". This may be accomplished by relocating the member 238 on shaft 20 one-tenth farther ahead in clock-wise direction, and relocating the member 256 on plate 255 to a point where it will engage the end of member 257 when reverse movement of crank 240 begins.

In ordinary key-set adding processes the items will be set up on the board and lever 45 pulled to add and list. In subtractive processes the minuend will first be placed in the totalizer and listed. The subtrahend will then be set in the board and listed, and the remainder read from the totalizer and listed. Listing as will be understood, is optional in any or all of the processes to which the machine is adapted.

Referring to Fig. 29, it will be observed that the type-bars 99 representing the several columns of value keys 1 are positioned with the cipher normally one step below the printing point of platen 70. A wing 267 affording a gravity catch, which swings on a cross-rod 268 engages a forwardly extending lip 269 on the bar 99. With the parts in the positions illustrated the main lever 45 may now be operated to reciprocate the bars 117 and 108 without printing on the listing sheet; but the platen will be rotated for line spacing. On the side of each arm 104 representing a value key-column is provided a stud 270 that normally engages the tapered head of a control member 271 which is loose on the rod 268 and contiguous the wing 267. A lug 272 extends from the member 271 to the left, across and in contact with the rear edge of wing 267. The member 271 is further provided with a forwardly extending finger 273 that is pressed upwardly by a spring 274, which is fixed to a cross-rod 275. Each wing 267 is provided with a lug 276 which extends to the right, Fig. 30, and in engagement with the rearward side of a lug 277 that extends to the left from each of said wings. For mechanical convenience these pairs of lugs 276—277 are arranged in staggered formation.

The object of the mechanism shown in Figs. 29 and 30 is primarily to provide for the printing of ciphers on the right or lower order side of a key column as represented by the type-bar. In other words where no other figure prints on the lower order a cipher will be shown, while the higher order side will show blank. In the normal position of parts each nose 105 is located one stage or step below the free end of its respective arm 104 which may be referred to as a one step lead. Upon actuation of one of the arms 104 by key depression, the stud 270 releases the control member 271, which will be turned rearwardly by spring 274 until the finger 273 engages the fixed stop-rod 279, at which time the lug 272 will have displaced the wing 267 forwardly to release the type-bar 99. Simultaneously through the lugs 276 in engagement with the lugs 277, all of the wings 267 to the right or lower order side of the displaced arm 104 will be moved from engagement with their respective bars 99. The wings 267 to the left or higher order side of the displaced arm 104 will not be moved and consequently their respective bars 99 will remain latched. Upon operation of bar 117 by lever 45, the bar 99 will shoot upwardly until stopped by the displaced arm 104, but having moved one step farther than said arm the type corresponding to the position of said arm will be located at the printing point of platen 70, meanwhile the series of bars 99 on the lower order side of the displaced arm 104 will have moved up one step into contact with their respective arm 104, resulting in a row of ciphers at the printing point. Upon restoration of the bar 117 each type-bar will thereby be restored to the one step lead below the arm 104, where they will be relatched when the displaced arm 104 restores to move its member 271 to normal and allow the wings to restore.

I claim:

1. In a machine such as described, in combination, multiple order key-driven differential mechanism, a reversible totalizer, multiplier dials fixedly alined with said orders, a normally disengaged individual operating element for each dial, and devices to move transversely with said totalizer, but with relatively reduced motion and in a direction opposite thereto for successively engaging said operating elements.

2. In a machine of the class described, in combination, key driven orders of differential mechanism, a reversely operative transversely movable totalizer, and planetary repeating devices controlled automatically in both directions to be driven optionally, in either direction for operating said totalizer selectively in either direction.

3. In a machine such as described, in combination, key-driven orders of differential mechanism, a reversely operative totalizer, planetary devices to turn in one direction for operating the totalizer selectively in either direction, and means fixedly aligned with said key orders for indicating the times the totalizer is operated.

4. In a machine such as described, in combination, key-set orders of differential mechanism, a reversely operative totalizer, planetary devices adapted to turn in one direction, with intermediate connections including vibratory elements whose range of movement is determined by the differential mechanism for operating said totalizer selectively in either direction, and adapted to turn in the opposite or reverse direction for operating said totalizer selectively in either direction, and means for indicating the times said totalizer is operated in either direction.

5. In a machine such as described, in combination, key-driven orders of differential mechanism, a reversely operative totalizer to be transversely moved to ordinal operating positions, planetary devices rotative in either direction, with intermediate connections to be operated in one direction by said devices for operating said totalizer selectively in either direction, and laterally fixed elements to be selected to indicate the times said totalizer is operated.

6. In a machine such as described, a multiplicand developing structure including indicating dials, a transversely adjustable totalizer on which to register the multiplicand, planetary elements to be turned to register the multiplicand and adapted to movement in either direction, and with intermediate means including vibratory devices between the planetary elements and the totalizer, and means movable with said elements to indicate the times the multiplicand is registered.

7. In a machine such as described, in combination, a main operating shaft which rotates in an invariable direction, a multiplier shaft adapted to be driven in either direction, and intermediate means including reversely operative planetary elements which cause said shafts to rotate with equal velocity.

8. In a machine such as described, in combination, orders of key-operated differential mechanism, devices to have a vibratory motion to an extent determined by the differential mechanism, a totalizer to be carried transversely and into engagement with the vibratory devices, dials which indicate the amount to which said columns are set, and planetary elements operating through said vibratory devices for repeating on the totalizer the amount indicated by the dials.

9. In a machine such as described, in combination, key-set orders of differential mechanism, a reversible totalizer adjustable transversely, laterally fixed reversible multiplier dials, means movable with said totalizer and with relatively reduced motion for selecting the appropriate dial, and intermediate means including a planetary device for concomitantly operating the totalizer and the dial selected.

10. In a machine such as described, in combination, orders of key-set differential mechanism, a reversely operative transversely adjustable totalizer, planetary devices for repeated operation of said totalizer, laterally fixed multiplier dials, and means for simultaneous operation of said dials and planetary devices.

11. In a machine such as described, in combination, orders of key-set differential mechanism, a reversely operative transversely adjustable totalizer, planetary devices to turn in one direction for repeated operation of said totalizer selectively in either direction, laterally fixed multiplier dials for indicating such repeated operation, and means for concomitantly operating said dials and planetary devices in either direction.

12. In a machine such as described, in combination, key-operated orders of differential mechanism, a reversely operative totalizer to traverse said columns to operating positions, actuators normally uncontrolled by and unresponsive to the differential mechanism, an operating lever to render said actuators responsive to the positions of the differential mechanism, and means to be adjusted to retain said actuator unresponsive and prevent restoration of the differential mechanism when said lever is operated.

13. In a machine such as described, in combination, key-operated orders of differential mechanism, actuators normally uncontrolled thereby and unresponsive thereto, a reversely operative totalizer to traverse and be positioned with respect to said columns, and a pivoted member to be moved in one direction from normal to render said actuators responsive, and to be moved in another direction from normal for restoring said columns.

14. In a machine such as described, in combination, key-operated orders of differential mechanism, actuators normally uncontrolled thereby and held normally unresponsive thereto, a reversely operative totalizer to be carried transversely into engagement with said actuators, an operating lever to render said actuators responsive and restore the differential mechanism, and means adjustable to hold said actuators non-responsive when said lever is operated.

15. In a machine such as described, in combination, key-operated orders of differential mechanism, actuators responsive thereto and normally held inactive and out of control of said mechanism, a lever to ordinally render said actuators responsive and restore the columns, and a member to render said actuators responsive independently of said lever, to prevent restoration of the columns by said lever, and to restore the columns independently of said lever.

16. In a machine such as described, in combination, key-set columns of differential mechanisms, actuators responsive thereto but normally uncontrolled thereby and normally held inactive, a member having a normal position and operative therefrom in one direction to release said actuators, and operative in another direction from normal to release said columns, and devices to resiliently retain said member in normal position.

17. In a machine such as described, in combination, a reversible totalizer to be transversely adjusted, key-operated orders of differential mechanism, actuators held unresponsive when said mechanism is set, a lever to render said actuators responsive and release the columns, devices adjustable to retain said actuators unresponsive to said differential mechanism when said lever is operated, and means to hold said devices adjusted when said lever releases the columns.

18. In a machine such as described, in combination, key-set orders of differential mechanism, listing devices and a transversely adjustable totalizer normally in inoperating engagement, means for repeated listing, together with accumulative totaling of key values, elements adjustable to retain meanwhile the keys and differentials against restoration, and further adjustable to permit optional release of said columns with the final listing movement.

19. In a machine such as described, in combination, key-operated differential mechanism, listing devices, and a reversible totalizer movable transversely, actuators normally engaging the totalizer and normally uncontrolled by and unresponsive to the differential mechanism, an element having a latitude of movement in one direction to render the actuators responsive and operate the listing devices, and in another direction to restore the differential mechanism, and means adjustable in one direction to prevent restoration of the differential mechanism by said element when said element is operated and adjustable in another direction to restore the differential mechanism.

20. In a machine such as described, in combination, key-operated differential mechanism, a transversely movable totalizer with digit wheels operative in either direction, plus and minus operating pawls to be moved reciprocally around an axis concentric with the axis of said wheels, and a normally disengaged reversing device plurally adjustable to render said pawls alternately effective.

21. In a machine such as described, in combination, key-set differential mechanism, a totalizer comprising reversely operative digit wheels to traverse said columns, a carrier with pawls to be moved reciprocally around an axis concentric with the axis of said wheels, a pawl changing element to move with and to have a limited movement with respect to said carrier, and a normally disengaged device to operate said changing element.

22. In a machine such as described, the combination with key-operated primary mechanism, of a totalizer comprising a series of digit wheels to be moved transversely of said columns to ordinal operating positions, a gear-plate to be primarily and rigidly driven, devices which cause said wheel to resiliently follow when said plate has attained a one-step or thirty-six degree lead in either direction, and means to lock said wheel in both directions until said plate attains such lead.

23. In a machine such as described, in combination, a main operating shaft having an invariable direction of rotation, a multiplier shaft adapted to rotation in either direction, connections including a planetary device to move said shafts with equal velocity, and adjustable means to indicate the times said multiplier shaft is rotated in either direction.

24. In a machine such as described, in combination, a series of actuating gear-segments, a main actuating shaft having an invariable direction of rotation, a multiplier shaft rotative in either direction, connections including a planetary device to turn said shafts with equal velocity, and means which indicate the number of times said shafts and actuating gears are operated.

JUSTIN T. HURLEY.